Oct. 11, 1966  B. J. WINESTOCK  3,278,818

STEP DRIVE

Filed Oct. 21, 1963

INVENTOR.
BERNARD J. WINESTOCK
BY
ATTORNEY 3,278,818
STEP DRIVE
Bernard J. Winestock, Los Angeles, Calif., assignor to Controls Company of America, Melrose Park, Ill., a corporation of Delaware
Filed Oct. 21, 1963, Ser. No. 317,680
8 Claims. (Cl. 318—119)

This invention relates to step drives such as rotary solenoids and the like and has for a general object the provision of a step drive of relatively simple construction which facilitates assembly and effects each step with relatively high torque.

Another object of this invention is to provide a step drive having a solenoid-type drive and control therefor, the drive and control being so constructed that they can be considered virtually independently of each other from a design and manufacturing standpoint but without sacrificing a unitary, functional construction in the final step drive assembly.

A further object of this invention is to provide a highly versatile control arrangement for a step drive, particularly one of the electrically operated solenoid type.

A still further object is to provide a relatively quiet operating solenoid-type step drive.

For the achievement of these and other objects of this invention, it is proposed to provide a step drive having a modular-type construction. The drive and control modules are separable and can be treated independently prior to final assembly, i.e. during manufacturing and testing, but are functionally and structurally related so that they can be combined to achieve a final, unitary assembly. Furthermore, it is also proposed that programming means be associated with the output member of the step drive, e.g. a rotatable shaft, to thereby provide a more versatile control arrangement in that various additional operational functions can be controlled during operation of the step drive and, moreover, the stepping operation itself can be controlled off of the driven member. Such a construction lends itself particularly well to the modular type of construction and, in addition, attributes increased versatility to the step drive unit from a design standpoint.

Other objects and advantages will be pointed out in, or be apparent from, the specification and claims, as will obvious modifications of the embodiment shown in the drawings, in which:

With particular reference to the drawings, a rotary solenoid-type step drive is illustrated as comprising a drive module 10, a power supply and control module 12 and a suitable output device 14. The output device is illustrated schematically and no details are shown since the drive can be used in combination with any type output device and the output device forms no part of this invention. For example, the drive could be used to perform stepping motor functions in general or specifically to drive a rotary switch, potentiometer, cams, etc.

Figure 4:
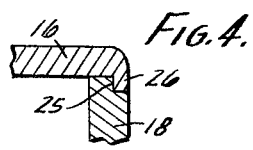
FIG. 4 is an enlarged section view of the connection of the stator end plate with the stator housing.

The drive module comprises a stator including an outer, generally cylindrical housing 16 and an end plate 18. An annular solenoid coil 20 is supported in the stator with one of its axial ends abutting shoulder 22 formed in housing 16 and its other end being engaged by the stepped inner face 24 of end plate 18. End plate 18 is suitably connected to the housing, for example the ends of housing 16 adjacent the end plate are rolled to provide lip 26 which engages and securely holds the end plate, and coil, in assembled relationship with the housing. As more specifically illustrated in FIG. 4, end plate 18 is preferably provided with a notch 25 for receipt of lip 26 to maintain a flush surface.

Figure 1:
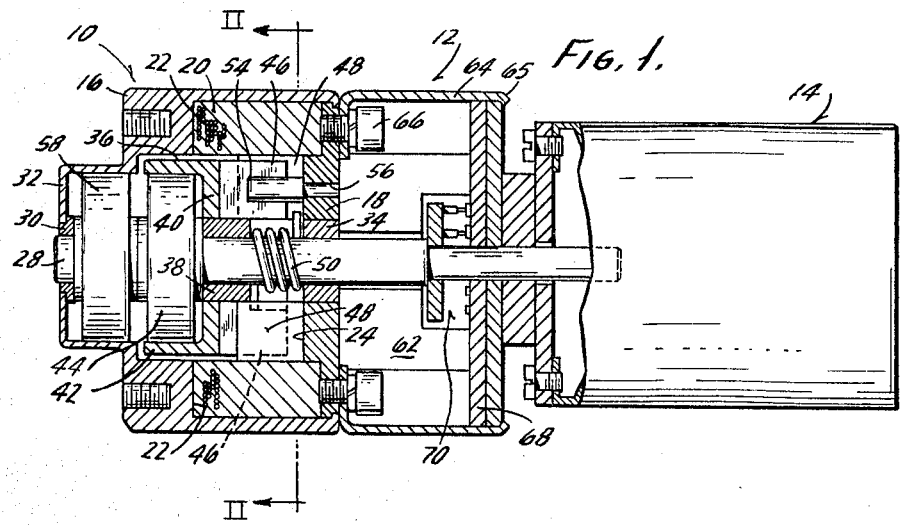
FIG. 1 is an axial section through a step drive including a drive module, a power supply and control module and schematically illustrating an output device.
Figure 2:
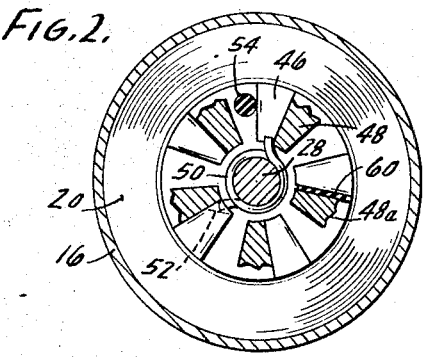
FIG. 2 is a section view generally along line 2—2 of FIG. 1 and illustrating the relative position of the rotor and stator vanes when the solenoid is energized.
Figure 3:
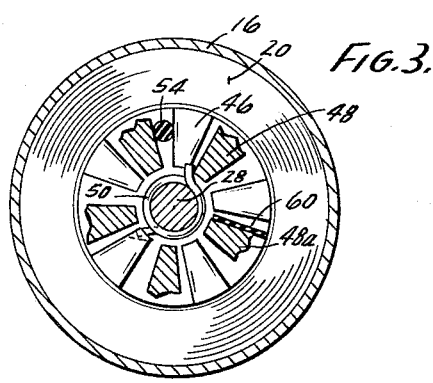
FIG. 3 is a view similar to FIG. 2 but illustrating the relative position of the stator and rotor vanes when the solenoid is de-energized.

An output shaft 28 is supported for rotation in drive module 10 by outboard bushing 30 supported in closed end 32 of the housing and inboard bushing 34 supported in end plate 18. Rotor 36 is disposed in housing 12 and is supported for rotation about shaft 28 by a rotor bushing 38. Structurally, rotor 36 includes a central, radially disposed body portion 40 and, on one side of the body portion, includes a generally cylindrical, axially extending flange portion 42. Flange 42 is concentrically arranged with and spaced from shaft 28 and, with the shaft, defines an annular opening for receipt of a one-way clutch 44. One-way clutch 44 can be of any suitable well-known design and is intended to selectively connect the rotor to the shaft as will be described more completely hereinafter. A plurality of rotor vanes 46 extend axially from the opposite side of central body portion 40 and are relatively spaced around the axis defined by shaft 28. The rotor vanes terminate in spaced relationship from inner face 24 of the end plate and the end plate is also provided with a plurality of stator vanes 48 which project axially toward the rotor. The stator vanes are relatively spaced around the axis defined by shaft 28 and, in the assembled drive module, are alternately arranged with the rotor vanes as illustrated in FIGS. 2 and 3. It will be noted that vanes 46 and 48 each include oppositely facing, radially disposed surfaces and that in each vane, for example vane 46, each of its oppositely facing surfaces confronts a radial surface of an adjacent stator vane so that, taking the rotor and stator vanes together, they include sets of confronting axially extending, radially disposed surfaces. Rotor spring 50 is coiled on the shaft with one end engaging one of the rotor vanes and its opposite end engaging one of the stator vanes, at least one of the rotor vanes being provided with a relief portion 52 for receipt of the spring end. Rotor spring 50 normally biases the rotor to a position wherein its vanes are spaced from the stator vanes as illustrated in FIG. 3 and, when coil 20 is energized, the stator and rotor become magnetized and vanes 46 are attracted to vanes 48 to move the rotor through an annular step of any desired, preset amount.

Movement of the rotor in response to energization of coil 20 is against the bias of rotor spring 50 so that when the coil is subsequently de-energized the spring returns the rotor to its normal, de-energized position. In this regard, the rotor spring is selected with a spring rate such that the force it exerts on the rotor is less than the magnetic attraction between the stator and rotor vanes and the rotor cannot return to its de-energized position until coil 20 is de-energized.

A stop 54 is preferably provided to limit the travel of the rotor when the coil is de-energized. Stop 54 is supported in an opening 56 in end plate 18 and, in addition to limiting return travel of the rotor, it also functions to establish the initial air gap, or spacing, between the rotor and stator vanes. With particular reference to FIG. 3, it will be noted that the rotor and stator vanes, when the coil is de-energized, are positioned in relative close proximity so that, upon energization of the coil, movement of the rotor is small but is effected with relatively high torque. The stop can be removed from the stator and by varying its diameter, or configuration, the initial air gap and rotor movement and torque can be varied as desired.

One-way clutch 44 operates to establish a driving connection between shaft 28 and rotor 36 in a clockwise direction (as viewed in FIG. 2) so that movement of the rotor in response to energization of the coil is imparted to the shaft and the clutch permits relative movement of the rotor and shaft in an opposite direction (counterclockwise) so that return movement of the rotor by spring 50 occurs without displacement of shaft 28. Because of the relatively small angular movement of the shaft in response to the step drive, the shaft may have a tendency to back-up when the coil is de-energized. Such back-up would cancel out the step made and to prevent back-up, a second one-way clutch 58 is arranged for engagement between housing 16 and shaft 28. One-way clutch 58 is arranged to permit clockwise movement of shaft 28, i.e. in the driven direction, but to hold the shaft against movement in the opposite direction so that the shaft cannot back-up from the position to which it has been driven by the solenoid drive.

Noise is a problem which is generally encountered in most types of solenoid action and pin 54 can be made of a suitable resilient material to reduce the noise which might otherwise occur when the solenoid is released. To achieve a further reduction in noise, it is also desirable to provide a second stop 60. Stop 60 may take the form of a layer of suitable material on at least one of the face of either the rotor or stator vanes. For example the stop may comprise a Mylar layer bonded with epoxy cement, or other suitable adhesive, to a face of stator vane 48a. In addition to cushioning the impact between the rotor and stator vanes, stop 60 also cooperates in establishing the amount of rotor travel which occurs when the solenoid coil is energized and, furthermore, provides a slight air gap between the rotor and stator vanes in the stepped position to facilitate subsequent release.

Power supply and control module 12 comprises, in general terms, a suitable electric power unit 62 which is effective to pulse coil 20 to achieve the stepping operation. The electric power supply is positioned within a cylindrical housing or can 64 and can be attached as a unit to end plate 18 by suitable fastening means such as bolts 66 which thread into openings in the end plate. Programming means 68 is preferably an integral part of the power module but can be mounted separately and independently therefrom and can take any suitable form such as a printed circuit. As illustrated, the programming means is connected in the power module by rolling the edge of can 64 to provide lip 65. The programming means is arranged for cooperation with a brush assembly 70 which is of well-known construction and is preferably connected to and rotatable with shaft 28, e.g. the brush assembly could be keyed to the shaft (not shown), and can cooperate in establishing the electrical energization of coil 20 and/or as can be used to control particular operational functions during a given step. The control functions to be effected through the brush assembly can be selected, and varied, easily and without disturbing the solenoid drive by changing the programming means to associate different printed circuits with the brush assembly.

Figure 5:
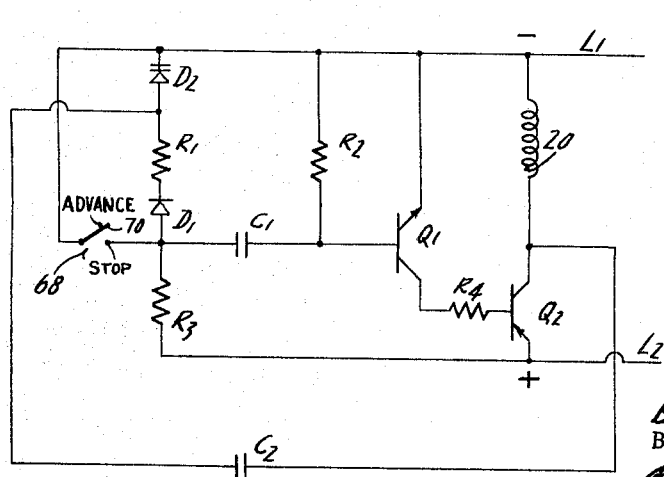
FIG. 5 is an illustration of a pulsing circuit which may be used to control the solenoid drive.

A control circuit which may be used in the power supply and control module is illustrated in FIG. 5. Solenoid coil 20 is connected across leads $L_1$ and $L_2$ which are in turn connected to a suitable source of electrical power. A transistor $Q_2$ is connected in circuit with coil 20 to control the state of energization thereof and the state of energization of transistor $Q_2$ is controlled by transistor $Q_1$. More specifically, capacitor $C_1$ in the base circuit of transistor $Q_1$, charges through resistance $R_3$ and the base circuit of transistor $Q_1$. Transistor $Q_1$ is thus rendered conductive and conducts through the base circuit of transistor $Q_2$, this renders transistor $Q_2$ conductive and coil 20 is energized. After a time determined by $C_1$ and $R_3$, $C_1$ becomes charged and the base potential of transistor $Q_1$ equals its emitter potential and $Q_1$ and $Q_2$ are rendered non-conductive and the solenoid current is interrupted thereby terminating a driven step. Upon interruption of the solenoid current, a reverse voltage pulse occurs across coil 20 which is differentiated by capacitor $C_2$. Capacitor $C_2$ applies a positive voltage spike across diode $D_2$, which is preferably a 4-layer switching device such as a Shockley-type diode, to render $D_2$ conductive. Capacitor $C_1$ discharges through $D_2$ and $D_2$ remains conductive until the charge on $C_1$ is dissipated whereupon the pulsing circuit is returned to its initial state in preparation for a subsequent step. This cycle will repeat itself, and steps will be made, until programming means 68 and brush assembly 70 cooperate to close a circuit to the base of $Q_1$, whereupon the potential of the base of $Q_1$ is clamped to the emitter potential of $Q_1$. That is, disengage the brush means from the "ADVANCE" contact and engage it with the "STOP" contact. The stepping operation cannot be re-instituted until this circuit is again opened allowing $Q_1$ to conduct. Other pulsing circuits may be used to control the step drive, for example that disclosed and claimed in the co-pending applications of Messrs. Bernard J. Winestock and John D. Schnable entitled Control Circuit, Ser. No. 317,666, filed Oct. 21, 1963 and assigned to the assignee of this application.

Returning now to the structure of the step drive constructed in accordance with this invention, the drive and power modules are separable so that they may be treated independently from design, manufacturing and testing standpoints but are functionally and structurally related so that they can be brought together to achieve a unitary final assembly. The separate modules utilize shaft 28 as a common mounting reference for most facile assembly and the modular, but interrelated, construction affords optimum attention to manufacturing and assembly details of each module without sacrificing the unitary nature of the finished assembly. It will be appreciated that, although it is stated that the drive and power modules can be treated independently from a design standpoint, they are still treated together in the sense that they must cooperate functionally in the final assembly; however, relatively more latitude is afforded in the basic designs and manufacturing techniques since both can be treated as separate modules.

The modular construction facilitates manufacture and assembly of the power and drive modules and in addition the particular construction of the drive module also greatly facilitates assembly of the drive module itself. More particularly, it will be noted that the housing 16 includes a closed end 18 and an opposite open end and that the components to go into the housing are capable of being assembled through the open end. More particularly, clutch 56 can be assembled adjacent the closed end of the housing and the shaft 28, with clutch 54 and rotor 36 assembled thereon, can then be inserted in the housing. The coil 20 can be assembled before or after the insertion of the rotor. Spring 50 is properly positioned on shaft 28 and end plate 18 is moved into its position to close the open end and rolled edge 26 formed to complete the drive module assembly. The power module can then be connected to end plate 18 and assembled onto the drive shaft which acts as a common reference to properly orient the two modules in assembly.

With this construction the drive and control modules are separate and independent but are functionally and structurally related so that when brought together they form a unitary, integrated assembly. The other dimensions of the drive and control module are preferably equal so as to further contribute to the unitary construction in the final assembly. The construction of the drive module is such that it facilitates assembly and, moreover, lends itself well to the modular type of construction. The programming means can be a part of the control module, as illustrated, or a separate module. Furthermore, a more versatile control is provided in that the programming means is associated with the output shaft so that shaft movement can also be used to control the programming means, this construction being particularly well adapted to the modular type construction but not necessarily limited thereto.

Although but one embodiment of the present invention has been illustrated and described, it will be apparent to those skilled in the art that various changes and modifications may be made therein without departing from the spirit of the invention or from the scope of the appended claims.

What I claim is:

1. Apparatus for providing stepped movement of a shaft in predetermined angular increments including drive means comprising, in combination,
   a stator including a generally hollow, elongated portion adapted to surround at least a portion of said shaft,
   first one-way clutch means positioned adjacent one end of said stator for engagement between said stator and said shaft to prevent rotation of said shaft in one direction,
   said stator also including an end plate arranged transversely of the axis defined by said shaft and disposed in spaced relationship from said first clutch means, said end plate including a plurality of axially disposed vanes arranged in relative spaced relationship around said axis,
   a rotor supported on said shaft intermediate said first clutch means and said end plate and including a plurality of axially disposed vanes relatively spaced around said axis, said rotor vanes extending toward and alternately arranged between said stator vanes, said rotor and stator vanes having first and second sets of radially disposed axially extending surfaces with the surface in each set arranged in relative confronting relationship,
   second one-way clutch means engaged between said rotor and said shaft and arranged to connect said shaft to said rotor for rotation therewith in a direction opposite to said one direction,
   biasing means connected between said rotor and said stator and biasing said rotor in said one direction to a normal position wherein said rotor vanes are spaced from said stator vanes with said first set of surfaces separated by a distance equal to one of said angular increments,
   and a generally annular electrical coil supported in said stator in general concentric and overlapping relationship with said rotor and operative when energized to magnetically attract said rotor vanes to said stator vanes and said first set of confronting surfaces toward engagement with each other.

2. The apparatus of claim 1 wherein said drive means includes a generally cylindrical, axially extending stop member releasably supported on said stator and positioned between one of said second sets of rotor and stator vane surfaces to engage said rotor and limit movement of said rotor vanes by said biasing means away from said stator vanes and effective to establish the spacing between said rotor and stator vanes in said normal position.

3. The apparatus of claim 1 including resilient means connected to one of said rotor and stator vane surfaces of one of said first sets of surfaces to maintain a minimum spacing between the vane surfaces of said first set of surfaces to cushion the impact of said rotor and stator vanes and reduce the noise of said magnetic attraction.

4. The combination of claim 1 wherein said rotor comprises a central portion having said vanes extending axially from one side thereof and including a generally cylindrical flange portion extending from the opposite side thereof in spaced relationship from said shaft to define a generally annular opening with said shaft, said second clutch means disposed in said annular opening for engagement between said cylindrical flange and said shaft.

5. Apparatus for providing stepped movement of a shaft in predetermined angular increments including drive means comprising, in combination,
   a stator including an elongated portion adapted to surround at least a portion of said shaft, said elongated portion including a closed end and having a generally hollow interior having a stepped portion defining a radially disposed surface facing the opposite end of said elongated portion,
   first one-way clutch means positioned adjacent said closed end of said stator for engagement between said stator and said shaft to prevent rotation of said shaft in one direction,
   said stator also including an end plate arranged transversely of said shaft and connected to and closing the opposite end of said elongated portion, said end plate including a plurality of axially disposed vanes arranged in relative spaced relation around said shaft,
   a rotor supported on said shaft intermediate said first clutch means and said end plate and including a plurality of axially disposed vanes relatively spaced around said shaft, said rotor vanes extending toward and alternately arranged between said stator vanes,
   second one-way clutch means engaged between said rotor and said shaft and arranged to connect said shaft to said rotor for rotation therewith in a direction opposite to said one direction,
   biasing means connected between said rotor and said stator and biasing said rotor in said one direction to a normal position wherein said rotor vanes are spaced from said stator vanes a distance equal to one of said angular increments,
   and a generally annular electrical coil supported in engagement with the radially disposed surface of said stator and disposed in general concentric and overlapping relationship with said rotor, said coil operative when energized to magnetically attract said rotor vanes to said stator vanes.

6. The apparatus of claim 5 wherein said rotor includes an axially extending, cylindrical portion defining an annular chamber with said shaft and opening toward said closed stator end, and wherein said second clutch means is disposed in said annular chamber for engagement between said shaft and said axially extending cylindrical portion.

7. In apparatus for providing stepped movement of a shaft in predetermined angular increments, drive means comprising, in combination,
   a stator including a plurality of means relatively spaced apart around the axis defined by said shaft and each defining first and second axially extending oppositely facing surfaces,
   a rotor including a plurality of means relatively spaced around said axis and each defining first and second axially extending, oppositely facing surfaces with the surfaces of said stator means confronting and disposed in proximity to but normally spaced from the surfaces of said rotor means,
   an electrical coil supported by said stator and operative when energized to produce a magnetic attraction between said rotor and stator faces for effecting movement of said rotor in one direction relative to said axis to move said first surfaces of said rotor means and stator means toward,
   means biasing said rotor in an opposite direction relative to said axis,
   means for connecting said rotor to said shaft to transmit movement of said rotor in said one direction to said shaft,
   and stop means releasably connected to said stator and extending axially between a pair of confronting ones of said rotor and stator surfaces, said stop means being generally cylindrical so that the thickness thereof determines the normal spacing between said first rotor and stator surfaces when said surfaces are spaced from each other and said spacing can be adjusted by selecting a stop means having a desired thickness to thereby adjust the amount of said stepped increment.

8. Apparatus for providing stepped movement of a shaft comprising, in combination,
   a drive module including
      a stator including a generally hollow, elongated portion adapted to surround at least a portion of said shaft,
      first one-way clutch means positioned adjacent one end of said stator for engagement between said stator and said shaft to prevent rotation of said shaft in one direction,
      said stator also including an end plate arranged transversely of the axis defined by said shaft and disposed in spaced relationship from said first clutch means, said end plate including a plurality of axially disposed vanes arranged in relative spaced relationship around said axis,
      a rotor supported on said shaft intermediate said first clutch means and said end plate and including a plurality of axially disposed vanes relatively spaced around said axis, said rotor vanes extending toward and alternatively arranged between said stator vanes,
      second one-way clutch means engaged between said rotor and said shaft and arranged to connect said shaft to said rotor for rotation therewith in a direction opposite to said one direction,
      biasing means connected between said rotor and said stator and biasing said rotor in said one direction to a normal position wherein said rotor vanes are spaced from said stator vanes a distance equal to one of said angular increments,
      a generally annular electrical coil supported in said stator in general concentric and overlapping relationship with said rotor and operative when energized to magnetically attract said rotor vanes to said stator vanes,
   an electric supply and control module separate from said drive module and having said shaft extending therethrough, said electric power supply and control module including programming means arranged on said shaft and brush means connected to and rotatable with said shaft and arranged for operative engagement with said programming means, said programming means connected to and operative to establish at least a portion of the control circuit for said electrical coil,
   and means releasably connecting said electric power supply and control module to said end plate.

References Cited by the Examiner

UNITED STATES PATENTS

| | | | |
|---|---|---|---|
| 2,499,632 | 3/1950 | Coake | 310—39 |
| 2,734,108 | 2/1956 | Huber | 317—197 X |
| 2,741,712 | 4/1956 | Lonnqvist | 310—37 |
| 2,863,103 | 12/1958 | Tancred | 317—197 |
| 3,046,460 | 7/1962 | Zemla | 318—132 |
| 3,121,812 | 2/1964 | MacArthur | 310—49 |

MILTON O. HIRSHFIELD, *Primary Examiner.*

D. F. DUGGAN, *Assistant Examiner.*